United States Patent
Ju

(10) Patent No.: US 11,048,116 B2
(45) Date of Patent: Jun. 29, 2021

(54) INVISIBLE DISPLAY DEVICE COMPRISING A PLURALITY OF INFRARED SUB-PIXELS EMITTING FIRST, SECOND, AND THIRD INFRARED LIGHT

(71) Applicant: Kyonggi University Industry & Academia Cooperation Foundation, Gyeonggi-do (KR)

(72) Inventor: Sang Hyun Ju, Gyeonggi-do (KR)

(73) Assignee: Kyonggi University Industry & Academia Cooperation Foundation, Gyeonggi-do (KR)

( * ) Notice: Subject to any disclaimer, the term of this patent is extended or adjusted under 35 U.S.C. 154(b) by 380 days.

(21) Appl. No.: 16/063,361

(22) PCT Filed: Dec. 18, 2016

(86) PCT No.: PCT/KR2016/014847
§ 371 (c)(1),
(2) Date: Aug. 13, 2018

(87) PCT Pub. No.: WO2017/105148
PCT Pub. Date: Jun. 22, 2017

(65) Prior Publication Data
US 2020/0271968 A1   Aug. 27, 2020

(30) Foreign Application Priority Data
Dec. 18, 2015   (KR) ........................ 10-2015-0181976

(51) Int. Cl.
*G02F 1/13357* (2006.01)
*G02F 1/1333* (2006.01)
*G02F 1/1335* (2006.01)

(52) U.S. Cl.
CPC ...... *G02F 1/1336* (2013.01); *G02F 1/133345* (2013.01); *G02F 1/133382* (2013.01); *G02F 1/133509* (2013.01); *G02F 1/133512* (2013.01)

(58) Field of Classification Search
CPC ......... G02F 1/133382; G02F 1/133509; G02F 1/1313; G09F 9/35
See application file for complete search history.

(56) References Cited

U.S. PATENT DOCUMENTS

2006/0244693 A1 * 11/2006 Yamaguchi ............. G06F 3/042 345/76
2009/0135318 A1 * 5/2009 Tateuchi ................. G06F 3/042 349/12

(Continued)

FOREIGN PATENT DOCUMENTS

CN   101566746 A   * 10/2009   ........... G06F 3/0421
JP   2006-040672   2/2006

(Continued)

OTHER PUBLICATIONS

International Search Report dated Mar. 28, 2017 for PCT/KR2016/014847.

*Primary Examiner* — Paul C Lee

(57) ABSTRACT

Disclosed is an invisible display device driving a display by using wavelengths of a region invisible to humans, thereby being capable of containing pieces of information, which humans no need to see but is necessary for a special purpose including socio-economic activities, and pieces of security information, which normal people should not see, and the invisible display device has a plurality of pixels arranged therein so as to emit infrared rays, wherein each of the plurality of pixels comprising: a first infrared sub pixel for emitting a first infrared ray of a first wavelength range; a second infrared sub pixel for emitting a second infrared ray (Continued)

of a second wavelength range different from the first wavelength range; and a third infrared sub pixel for emitting a third infrared ray of a third wavelength range different from the first and second wavelength ranges.

20 Claims, 7 Drawing Sheets

(56) References Cited

U.S. PATENT DOCUMENTS

| | | | |
|---|---|---|---|
| 2013/0334402 A1* | 12/2013 | Izuha | G02F 1/015 |
| | | | 250/208.1 |
| 2014/0085268 A1 | 3/2014 | Wang | |
| 2016/0033822 A1* | 2/2016 | Jiang | G02F 1/13338 |
| | | | 349/33 |

FOREIGN PATENT DOCUMENTS

| | | |
|---|---|---|
| KR | 10-2009-0051613 | 5/2009 |
| KR | 10-0982535 | 9/2010 |
| KR | 10-2015-0085392 | 7/2015 |

* cited by examiner (a)          (b)          (c)

INVISIBLE DISPLAY DEVICE COMPRISING A PLURALITY OF INFRARED SUB-PIXELS EMITTING FIRST, SECOND, AND THIRD INFRARED LIGHT

This application claims the priority of Korean Patent Application Nos. 10-2015-0181976, filed on Dec. 18, 2015 in the KIPO (Korean Intellectual Property Office), the disclosure of which is incorporated herein entirely by reference. Further, this application is the National Stage application of International Application No. PCT/KR2016/014847, filed Dec. 18, 2016, which designates the United States and was published in Korean. Each of these applications is hereby incorporated by reference in their entirety into the present application.

TECHNICAL FIELD

The present disclosure relates to an invisible display device.

BACKGROUND ART

A visible information displaying device (a device for displaying the information which can be seen with the naked eye) such as a full-color display device has been well known and is realized by a light emitting module including a cathode ray tube, a liquid crystal, a light emitting diode (LED) and an organic light emitting diode (OLED). In the conventional full color display device, each pixel includes three (3) sub-pixels for displaying three (3) primary colors such as, for example, red color, green color and blue color. These three sub-pixels emit the colored light with a proper intensity to enable the full-color information to be realized.

In addition, a monochrome display device displaying the monochrome image displays the information, characters or figures thereon using the required one color. Like the full-color display device, such monochrome display device can be embodied as a light emitting module such as a cathode ray tube, a liquid crystal, a light emitting diode (LED) and an organic light emitting diode (OLED).

As another type of the display device, meanwhile, the invisible information (which cannot be seen with the naked eye, but can be observed by using a night vision or a wavelength converting device) displaying device such as the infrared radiation (IR) displaying device has been employed. Such invisible display device can be realized on the basis of the technology applied to the visible information displaying device.

However, this invisible display device can realize only a display of the monochrome information and a technology realizing different colors for providing the viewers with the display information has not been developed. In other word, since the conventional invisible display device displays the monochrome image information, this device has a limitation in displaying the information.

The above-described information disclosed in the background description is provided only for improving the understanding of the background of the present disclosure, and thus may include the information which does not constitute the prior art.

DISCLOSURE OF THE INVENTION

Technical Problem

It is an object of the present disclosure to provide a high-quality invisible display device capable of realizing the invisible information including images, characters or figures in multi colors using the wavelength in ranges which cannot be observed with the naked eye.

It is another object of the present disclosure to provide the invisible display device capable of effectively blocking the infrared light caused by the heat generated from a pixel and a circuit pattern when the invisible information to accurately display the invisible information.

Technical Solution

An invisible display device according to the present disclosure has a plurality of pixels arranged therein for emitting infrared light, each of the pixels includes a first infrared sub-pixel emitting first infrared light in a first wavelength range, a second infrared sub-pixel emitting second infrared light in a second wavelength range; and a third infrared sub-pixel emitting third infrared light in a third wavelength range. Here, the first wavelength range may be smaller than the second wavelength range, and the second wavelength range may be smaller than the third wavelength range.

In addition, the first infrared light, the second infrared light and the third infrared light may have the same wavelength range and may have the different wavelength intensities.

The plurality of pixels may be realized by including a liquid crystal structure.

The liquid crystal structure may include a substrate; a circuit pattern formed on one face of the substrate; a liquid crystal layer formed on the circuit pattern; a selective infrared light-wavelength transmitting filter formed on the liquid crystal layer; and an infrared-light backlight provided on the other face of the substrate to emit the infrared lights in the wavelength range including the first, second and third wavelength ranges. The selective infrared light-wavelength transmitting filter may include a first selective infrared light-wavelength transmitting filter region formed on the liquid crystal layer to realize the first sub-pixel; a second selective infrared light-wavelength transmitting filter region formed on the liquid crystal layer to realize the second sub-pixel; and a third selective infrared light-wavelength transmitting filter region formed on the liquid crystal layer to realize the third sub-pixel. The first, second and third selective infrared light-wavelength transmitting filter regions may be formed of meta-materials for transmitting the infrared light or multi-insulator filter materials. The circuit pattern formed at an outside, which is not overlapped with the first, second and third selective infrared light-wavelength transmitting filter regions in the vertical direction, may be covered with an infrared light shielding member.

The plurality of pixels may be realized by including a light emitting structure.

The light emitting structure may include a substrate; a circuit pattern formed on one face of the substrate; and an infrared light emitting part formed on the circuit pattern. The infrared light emitting part may include a first infrared light emitting region realizing the first infrared sub-pixel, a second infrared light emitting region realizing the second infrared sub-pixel and a third infrared light emitting region realizing the third infrared sub-pixel. The circuit pattern formed at an outside, which is not overlapped with the first, second and third infrared light emitting regions in the vertical direction, may be covered with an infrared light shielding member. The first, second and third infrared light emitting regions may be formed of first, second and third infrared light quantum dots, respectively. The first, second and third infrared light emitting regions may be formed of resistors, respectively. The resistors are formed of an organic conductive material or inorganic conductive material. The resistors are formed of an indium tin oxide (ITO), an indium zinc oxide (IZO), a zinc oxide, a flourine doped tin oxide (FTO), a grapheme. The resistors are formed of nickel, aluminum, silver, gold, chromium, or alloy metal of them. The first, second and third infrared light emitting regions may be formed of the first, second and third infrared light resistors. The first, second and third infrared light resistors may have resistance values differing from each other. The resistance value of the first infrared light resistor may be greater than that of the second first infrared light resistor and the resistance value of the second infrared light resistor may be greater than that of the third first infrared light resistor. In addition, the first, second and third infrared light resistors have the same electrical resistance value and the currents applied to the first, second and third infrared light resistors, respectively, may have the magnitudes which differ from each other.

Each of a plurality of pixels may include a first visible light sub-pixel formed at one side of the first infrared sub-pixel to emit first visible light; a second visible light sub-pixel formed at one side of the second infrared sub-pixel to emit second visible light; and a third visible light sub-pixel formed at one side of the third infrared sub-pixel to emit third visible light. Only the first, second and third infrared sub-pixels may be operated, the first, second and third infrared sub-pixels may be operated together with the first, second and third visible light sub-pixels, or only the first, second and third visible light sub-pixels may be operated.

Advantageous Effects

The invisible display device of the present disclosure realizes the invisible information by using the wavelength in the ranges which cannot be observed with the naked eye to display the information which is unnecessary for a human to view, but is required for special purposes including socio-economic activities or the security information which is not allowed to be observed by the public, in multi-colors so that it is possible to increase the recognition rate of the information.

In other words, the invisible display device of the present disclosure is advantageous in that the first sub-pixel constituting the pixel emits the first infrared light in the first wavelength range, the second sub-pixel constituting the pixel emits the second infrared light in the second wavelength range and the third sub-pixel constituting the pixel emits the third infrared light in the third wavelength range so that it is possible to realize the multi-colored information as in the conventional visible information displaying device.

In addition, the invisible display device of the present disclosure effectively blocks the infrared light caused by heat which is unnecessarily generated in the circuit pattern and/or the visible light sub-pixel when the invisible information is displayed, thereby enabling the information to be accurately transmitted by the invisible information.

In other words, the present disclosure is advantageous in that the thermal infrared light which is unnecessarily generated from the circuit pattern and/or the visible light sub-pixel is covered with the infrared light shielding member to prevent the thermal infrared light from being interfered with the invisible information to be display so that it is possible to accurately transmit the invisible information.

MODE FOR CARRYING OUT THE INVENTION

Figure 1:
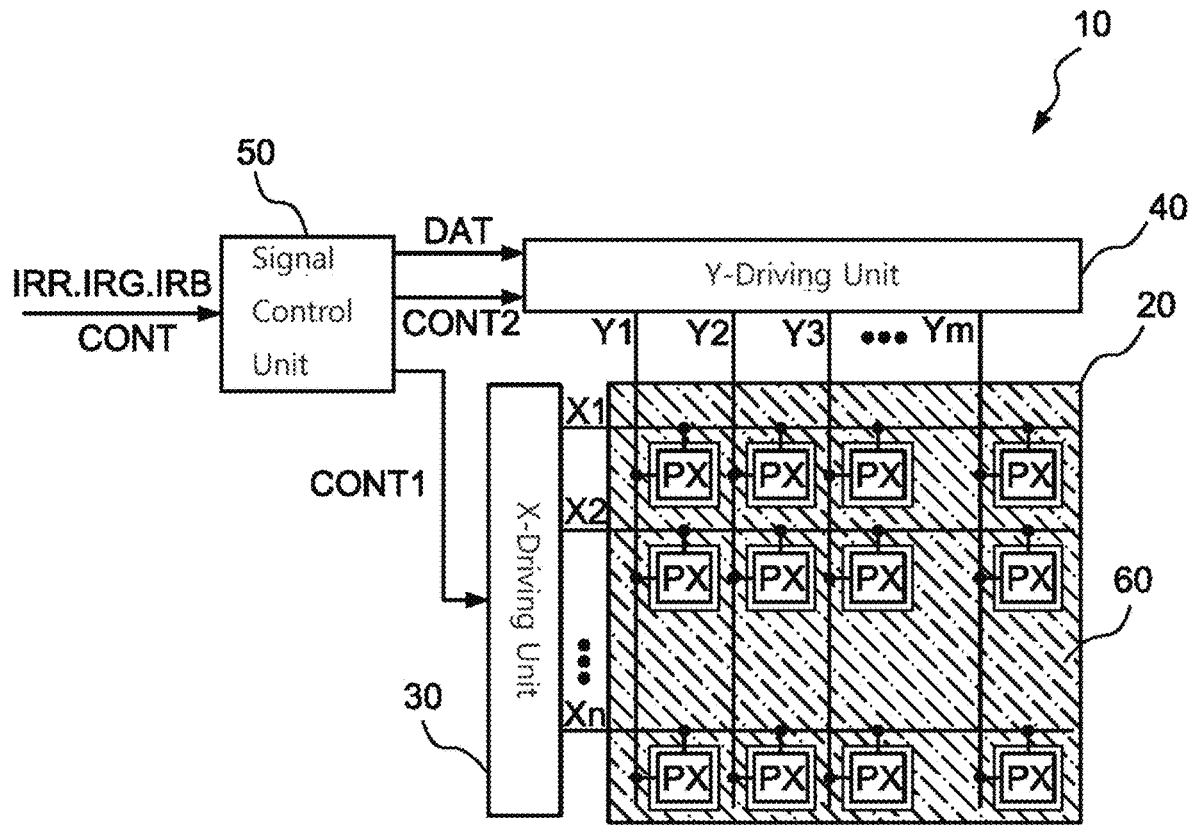
FIG. 1, FIG. 2 and FIG. 3 are a block diagram illustrating a configuration of an invisible display device according to the present disclosure, a schematic plane view illustrating a structure of a sub-pixel, an explanation view illustrating an infrared light wavelength range assigned to a sub-pixel.

Hereinafter, a preferred embodiment of the present disclosure will be elucidated in detail with reference to the accompanying drawings.

The embodiments of the present disclosure are provided for more completely explaining the present disclosure to those skilled in the art, the below embodiments can be modified to various forms and the scope of the present disclosure is not limited to the below embodiments. These embodiments are rather provided for more faithfully and completely explaining the present disclosure and for completely conveying the spirit of the present disclosure to those skilled in the art.

In the drawings, in addition, the dimension or thickness of each layer is exaggerated for clarity and convenience of the description and the same reference numeral indicates the same structural element. As used in the detail description, the term "and/or" includes any one of the listed items and one or more combination thereof. In addition, the term "connect" in the detail description means the state in which A member is directly connected to B member as well as the state in which C member disposed between A member and B member so that A member is indirectly connected to B member via C member.

The terms used herein are employed for describing the specific embodiment and the present disclosure is not limited thereto. As used in the detailed description and the appended claims, the singular forms may include the plural forms as well, unless the context clearly indicates otherwise. In addition, the terms "comprises" and/or "comprising" or "includes" and/or "including" used in the detailed description specify the presence of stated features, regions, integers, steps, operations, elements, and/or components, but do not preclude the presence or addition of one or more other features, regions, integers, steps, operations, elements, components, and/or groups thereof.

Although the terms of "first", "second", etc. are used herein to describe various members, parts, regions, layers and/or sections, it is obvious that these members, parts, regions, layers and/or sections should not be limited by the above terms. These terms are employed only for distinguishing one member, part, region, layer or section from another region, layer or section. Thus, the first member, the first part, the first region, the first layer or the first section described below may refer to the second member, the second part, the second region, the second layer or section without departing from the teachings of the present disclosure.

Furthermore, the terms related to a space such as "beneath", "below", "lower", "above" and "upper" may be used to easily understand one element or a characteristic or another element or a characteristic illustrated in the drawings. The above terms related to the space are employed for easy understanding of the present disclosure depending on various process states or usage states of the present disclosure, and are not intended to limit the present disclosure.

Hereinafter, an invisible display device according to one embodiment of the present disclosure is described.

Figure 2:
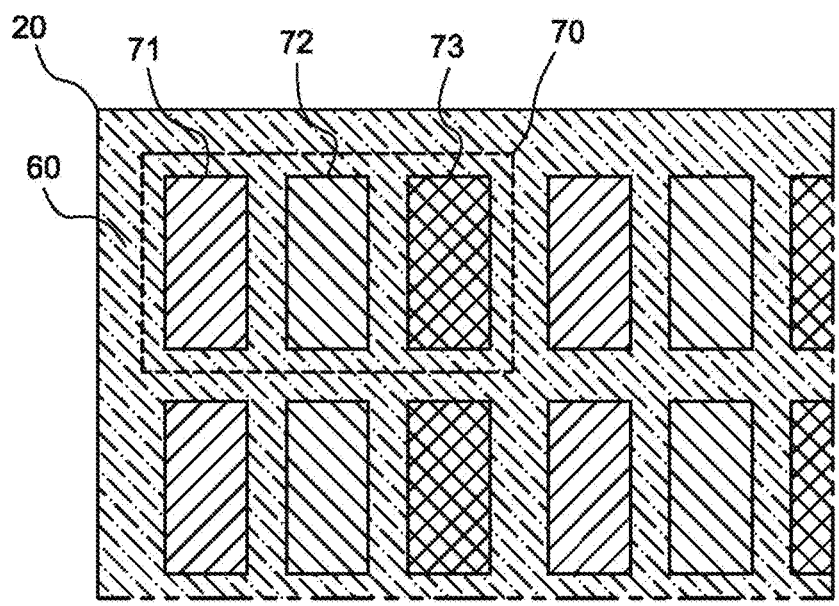
Figure 3:
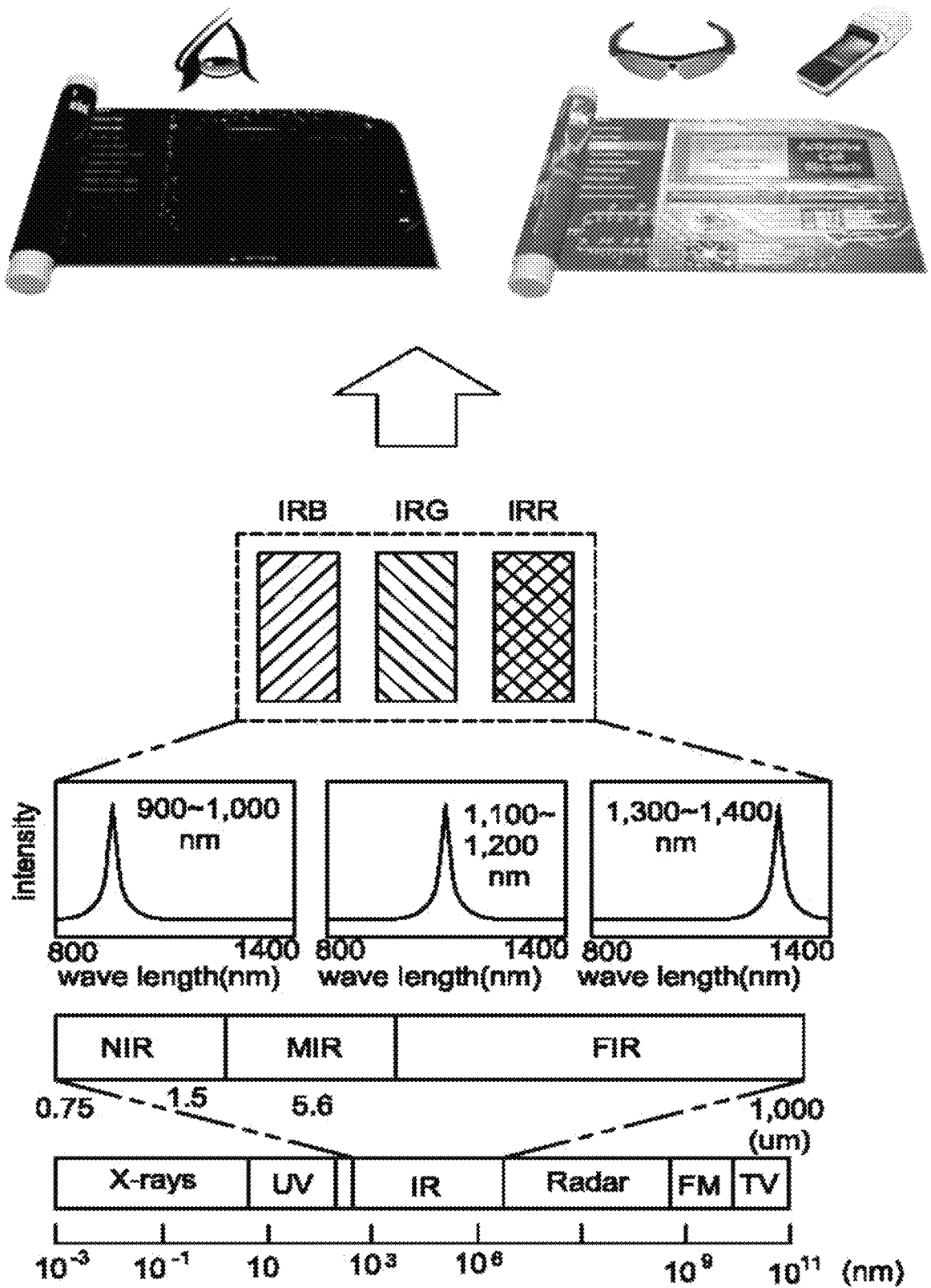

FIG. 1, FIG. 2 and FIG. 3 are a block diagram illustrating a configuration of an invisible display device, a schematic plane view illustrating a structure of a sub-pixel, an explanation view illustrating an infrared light wavelength range assigned to a sub-pixel according to the present disclosure, respectively.

As shown in FIG. 1, an invisible display device 10 includes a display panel 20, a X-driving unit 30 which is electrically connected to the display panel 20, a Y-driving unit 40 which is electrically connected to the display panel 30 and a signal control unit 50 controlling the above elements. In addition, the invisible display device 10 may further include an infrared light shielding member 60.

The invisible display device 10 displays a variety of the invisible information formed by the invisible wavelength. Here, the information includes any one of the image, the text and the figure or a combination thereof, and the invisible information means the information formed by the light of the invisible wavelength, and the infrared light information means the information formed by the infrared light of the invisible wavelength. The invisible display device 10 may form at least two-colored or full color invisible information or the monochrome and invisible information whose color is changed over time.

In an equivalent circuit, the display panel 20 may include a plurality of display signal lines $X_1 \sim X_n$, $Y_1 \sim Y_m$, and a plurality of infrared pixels PX connected to the display signal lines and arranged in a matrix shape. Substantially, three (3) infrared sub-pixels PX may constitute one infrared pixel PX. In addition, each sub-pixel PS may include a circuit pattern (not shown). Here, the circuit pattern is the concept including a plurality of signal lines for supplying the signal and the power, a wiring, at least one transistor or a semiconductor device for switching or driving the sub-pixel, at least one capacitor for storing the information.

The display signal lines $X_1 \sim X_n$, $Y_1 \sim Y_m$, includes a plurality of X lines $X_1 \sim X_n$ for transmitting the X signal (for example, the gate signal) and a plurality of Y lines $Y_1 \sim Y_m$, for transmitting the Y signal (for example, the data signal). The X lines $X_1 \sim X_n$ are extended in the first direction and parallel to each other and the Y lines $Y_1 \sim Y_m$, are extended in the second direction and parallel to each other. The first direction may be a column direction and the second direction may be a row direction.

The X-driving unit 30 sequentially outputs the ON/OFF voltage $V_{on}$, $V_{off}$ to a plurality of X lines $X_1 \sim X_n$ in response to a X control signal CONT1 provided from the signal control unit 50.

The Y-driving unit 40 receives a Y control signal CONT2 and the information data DAT from the signal control unit 50, selects a grayscale voltage corresponding to the information data DAT and provides the lines $Y_1 \sim Y_m$, with the selected grayscale voltage.

The signal control unit 50 receives IRR, IRG and IRB signals from an external graphic controller (not shown) and receives external clock signals controlling a display of the IRR, IRG and IRB signals. Here, the IRR is the abbreviation of Infrared Red, the IRG is the abbreviation of Infrared Green, and the IRB is the abbreviation of Infrared Blue.

The signal control unit 50 receives the source information, that is, the IRR, IRG and IRB signals for displaying the information on the display panel 20, creates the information data DAT corresponding to the above signals and provides the Y driver with the information data. Also, the signal control unit 50 creates the internal clock signals, that is, the X control signal CONT1 and the Y control signal CONT2 on the basis of the external clock signals which is input thereto, and then outputs these control signals.

Meanwhile, the display panel 20 may be covered with an infrared light shielding member 60 to prevent the infrared light from irradiating from the circuit pattern placed beside the sub-pixels PX. Except the sub-pixels PX which substantially emits the infrared light, the regions placed beside the sub-pixels may be covered with the infrared-light shielding member 60. Here, the infrared light shielding member 60 may be formed of, for example, material including Nickel (Ni), Aluminum (Al), Silver (Au), Gold (Ag), Chromium (Cr), Copper (Cu), ferrum (Fe) or alloy metal of them. The infrared light shielding member 60 may be formed of, for example, material including an indium tin oxide (ITO), an indium zinc oxide (IZO), a zinc oxide, a flourine doped tin oxide (FTO), or a grapheme. In addition, the infrared light shielding member 60 may be formed by thin layer or meta-patterning. Here, meta-patterning means a pattern of a meta material in which a thin film of a rectangular shape, a circular shape, or a ring shape is repeated. In addition, the infrared light shielding member 60 may be formed by stacking a metal material-based infrared light absorbing thin layer and a ceramic material-based electrical insulating thin layer. At this time, the ceramic material-based electrical insulating thin layer is formed between the circuit pattern and the metal material-based infrared light absorbing thin layer to prevent an electrical short of the circuit patterns. In addition, the ceramic material-based electrical insulating thin layer has a thermal insulating property with a low thermal conductivity and can prevent the heat generated from the circuit pattern from being transmitted to the metal material-based infrared light absorbing thin layer. The ceramic material-based electrical insulating thin layer may be formed of ceramic material such as alumina, zirconia, silicon oxide and silicon nitride.

Hereinafter, the pixel and the sub-pixel are indicated by different reference numerals and elucidated again.

As shown in FIG. 2, a plurality of infrared pixels 70 are arranged in a arranged in a matrix shape, and one infrared pixel 70 may include three (3) infrared sub-pixels 71, 72 and 73. Here, three (3) infrared sub-pixels 71, 72 and 73 may emit the infrared lights in the wavelength ranges, respectively, which differ from each other. For example, each infrared pixel 70 may include the first infrared sub-pixel 71 emitting the first infrared light in the first wavelength range, the second infrared sub-pixel 72 emitting the second infrared light in the second wavelength range which differs from the first wavelength range, and the third infrared sub-pixels 73 emitting the third infrared light in the third wavelength range which differs from the first and second wavelength ranges.

In addition, three infrared sub-pixels 71, 72 and 73 may emit the infrared lights which are in the same wavelength range or have the same wavelength and have the intensities differing from each other. For example, the infrared pixel 70 may include the first infrared sub-pixel 71 emitting the infrared light having the first wavelength and the intensity, the second infrared sub-pixel 72 emitting the infrared light having the second wavelength and the intensity smaller than the that of the infrared light emitted from the first infrared sub-pixel, and the third sub-pixel 73 emitting the infrared light having the third wavelength and the intensity smaller than the that of the infrared light emitted from the second infrared sub-pixel. At this time, the infrared lights emitted from the first sub-pixel, the second sub-pixel and the third sub-pixel are in the same wavelength range or have the same wavelength. If the intensities of the first wavelength, the second wavelength and the third second wavelength differ from each other, the infrared lights emitted from the sub-pixels can be classified and observed as the different colors by using a vision equipment such as a thermo-graphic camera. Therefore, by differentiating the wavelength intensities of the first wavelength, the second wavelength and the third wavelength, the required infrared light information can be realized.

A driving circuit region including a switching transistor, a driving transistor and a capacitor for driving the first, second and third infrared sub-pixels 71, 72 and 73 and an outer side region except the first, second and third infrared sub-pixels 71, 72 and 73 may be covered with the infrared light shielding member 60 for removing infrared noise caused by heat generated when an embedded/external circuit is operated.

As shown in FIG. 3, the first infrared sub-pixel may emit the first infrared light in the first wavelength range of approximately 900 to 1,000 nm, the second infrared sub-pixel may emit the second infrared light in the second wavelength range of approximately 1,100 to 1,200 nm, and the third infrared sub-pixel may emit the third infrared light in the third wavelength range of approximately 1,300 to 1,400 nm. Therefore, the invisible display device according to the present disclosure can provide the multi-color or full color-infrared light information. Of course, such this infrared light information is not observed with the naked eye, but can be recognized by the night vision or a special wavelength converting device.

Here, the first, second and third wavelength ranges are exemplary values for understanding the present disclosure, and it should be not interpreted that the present disclosure is not limited to above wavelength ranges. In other words, according to a characteristic of the color to be displayed, the above wavelength range can be adjusted to the various infrared light range (0.75~1,000 nm).

In this way, unlike the conventional display device, the invisible display device 10 according to the present disclosure can provide the multi-colored infrared light information, not the monochrome infrared light information so that it is possible to deliver the information formed of the high-quality image and/or text. In the invisible display device 10 according to the present disclosure, in addition, the driving circuit region including the switching transistor, the driving transistor and the capacitor for driving the first, second and third infrared sub-pixels 71, 72 and 73 providing the infrared light information, and the remaining region (a wiring layer or a semiconductor layer, etc.) of the circuit pattern except the first, second and third infrared sub-pixels 71, 72 and 73 are covered by the infrared light shielding member 60 so that the infrared light noise emitted from the above elements is blocked to allow the infrared light information to be accurately transmitted.

Figure 4:
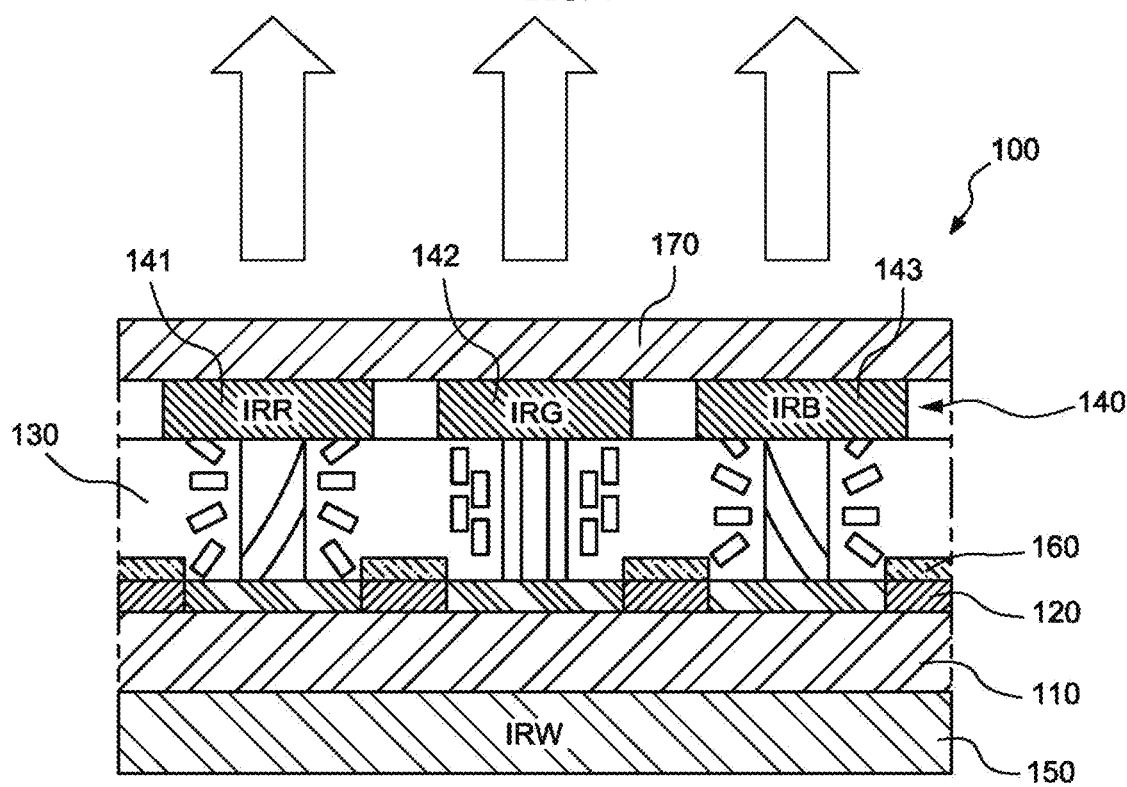
FIG. 4, FIG. 5 and FIG. 6 is a schematic sectional view illustrating an invisible display device according to one embodiment of the present disclosure, a schematic perspective view illustrating a meta-material or multi-insulator filter material for transmitting the infrared light having a selective wavelength FIG. 7
Figure 5:
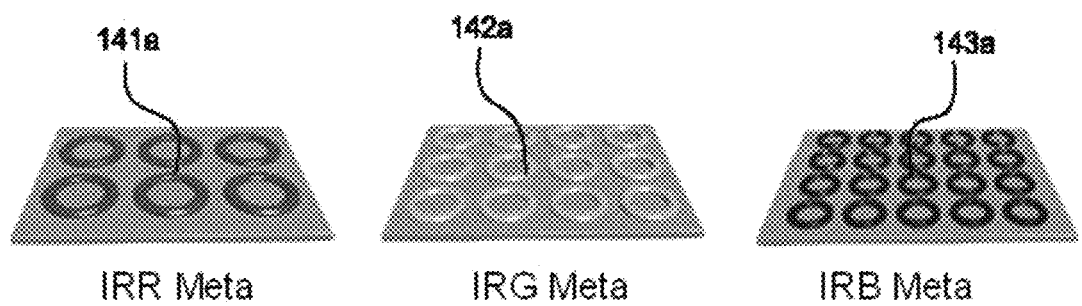
Figure 6:
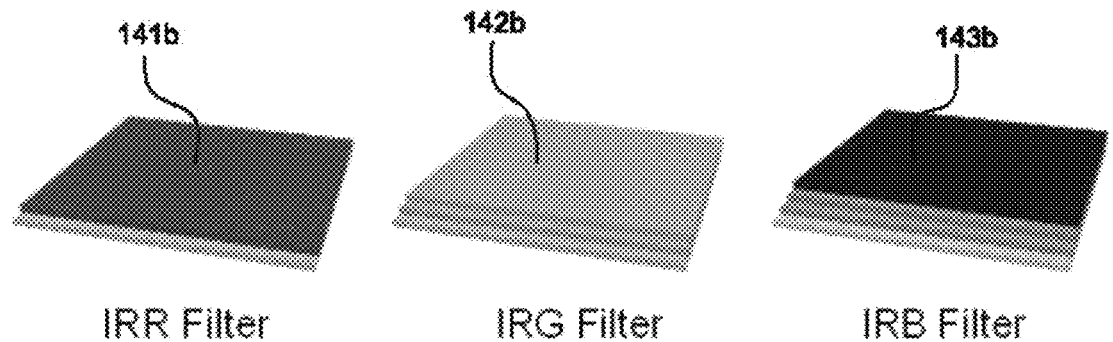

FIG. 4, FIG. 5 and FIG. 6 are a schematic sectional view illustrating an invisible display device, a schematic perspective view illustrating meta-material for transmitting the infrared light having a selective wavelength and a schematic perspective view illustrating multi-insulator filter material according to one embodiment of the present disclosure, respectively.

As shown in FIG. 4, an invisible display device 100 according to the present disclosure may be realized by a liquid crystal structure. Such liquid crystal structure may include a substrate 110, a circuit pattern 120, a liquid crystal layer 130, a selective infrared light-wavelength transmitting filter 140, an infrared-light backlight 150 and an infrared light shielding member 160. Substantially, this liquid crystal structure is almost the same as a liquid crystal display device displaying the visible-light information, but there is a difference therebetween.

The substrate 110 is formed in an approximately flat plate-shape and may be formed of any one selected from glass, plastic and equivalent thereof through which the infrared light can penetrates. However, the present disclosure is not limited thereto. Here, the infrared light may be in the first, second and third wavelength ranges as described above.

The circuit pattern 120 is formed on an upper face of the substrate 110. The circuit pattern 120 may consist of a wiring formed of cooper or aluminum, a semiconductor device including a thin film transistor and a capacitor. However, the present disclosure is not limited thereto.

The liquid crystal layer 130 is formed on the circuit pattern 120, and an opening angle of the liquid crystal layer is adjusted according to a voltage applied by the circuit pattern 120 to allow the infrared light intensity emitted through the selective infrared light-wavelength transmitting filter 140 to be adjusted. At this time, the liquid crystal layer 130 has the function of blocking the infrared light.

The selective infrared light-wavelength transmitting filter 140 is formed on a face of the liquid crystal layer 130 and includes a first selective infrared light-wavelength transmitting filter region 141 allowing only the first infrared light to be transmitted therethrough to realize the first infrared sub-pixel 71. In addition, the selective infrared light-wavelength transmitting filter 140 includes a second selective infrared light-wavelength transmitting filter region 142 allowing only the second infrared light to be transmitted therethrough to realize the second infrared sub-pixel 72. Furthermore, the selective infrared light-wavelength transmitting filter 140 may include a third selective infrared light-wavelength transmitting filter region 143 allowing only the third infrared light to be transmitted therethrough to realize the third infrared sub-pixel 73.

The infrared-light backlight 150 is formed on a lower face of the substrate 110 and has the function of emitting the infrared light in the first, second and third wavelength ranges. In other words, when the infrared-light backlight 150 emits the infrared light in the first, second and third wavelength ranges or the wavelength range including the first, second and third wavelength ranges, the first selective infrared light-wavelength transmitting filter region 141 transmits only the first infrared light to an outside, the second selective infrared light-wavelength transmitting filter region 142 transmits only the second infrared light to an outside, and the third selective infrared light-wavelength transmitting filter region 143 transmits only the third infrared light to an outside to allow the multi-colored or full color infrared light information to be realized.

The infrared light shielding member 160 covers the driving circuit of the pixels, which are not overlapped with the first, second and third selective infrared light-wavelength transmitting filter regions 141, 142 and 143 in the vertical direction, and the circuit pattern 120 (the wiring and/or the semiconductor device, etc.) formed at an outside to allow the infrared light in the unnecessary wavelength range not to be discharged through the invisible display device 100.

Meanwhile, a protection glass 170 may be further placed on an upper face of the selective infrared light-wavelength transmitting filter 140 to protect this filter. The protection glass 170 may be formed of material such as glass, plastic or wafer.

Due to the above structure, in the invisible display device 100 including the liquid crystal structure according to the present disclosure, the infrared-light backlight 150 emits the first, second and third infrared lights in the whole infrared light wavelength range, that is, in the first, second and third wavelength ranges and the selective infrared light-wavelength transmitting filter 140, that is, the first, second and third selective infrared light-wavelength transmitting filter regions 141, 142 and 143 selectively transmits the first, second and third infrared light, so that the invisible display device displays the multi-colored infrared light information. Furthermore, the liquid crystal structure can change the color of the infrared light information realized in monochrome over the time.

Meanwhile, the first, second and third selective infrared light-wavelength transmitting filter regions 141, 142 and 143 are formed of meta-materials 141a, 142a and 143a for transmitting the infrared light, respectively, as shown in FIG. 5, or formed of multi-insulator filter materials 141b, 142b, 143b for transmitting the infrared light, respectively, as shown in FIG. 6 to enable the infrared light in the first, second and third wavelength ranges regions to be transmitted. In the present disclosure, therefore, the first, second and third selective infrared light-wavelength transmitting filter regions 141, 142 and 143 can selectively transmit only the infrared light in the desired wavelength range to enable various kinds of the infrared light information to be easily realized.

Figure 7:
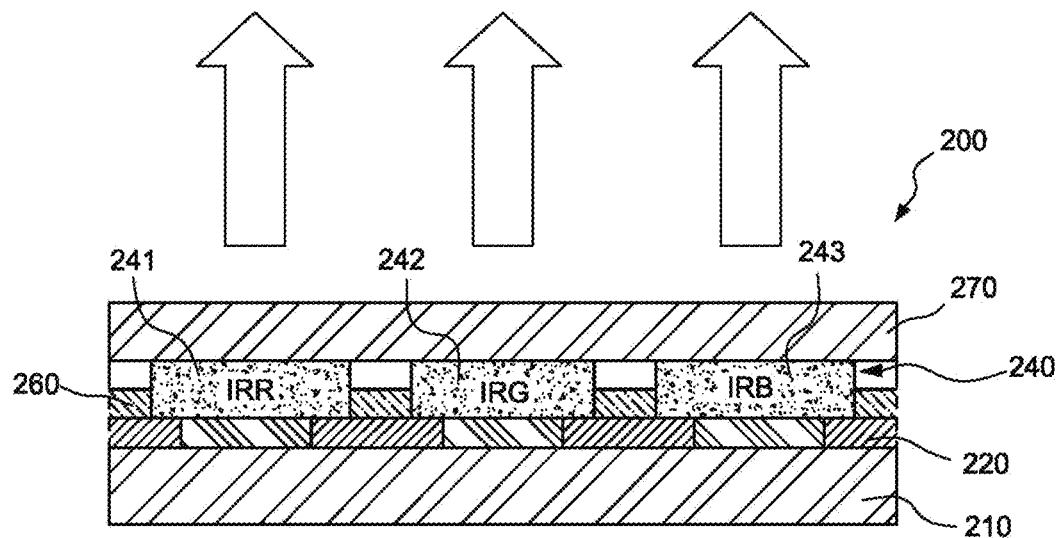
Figure 8:
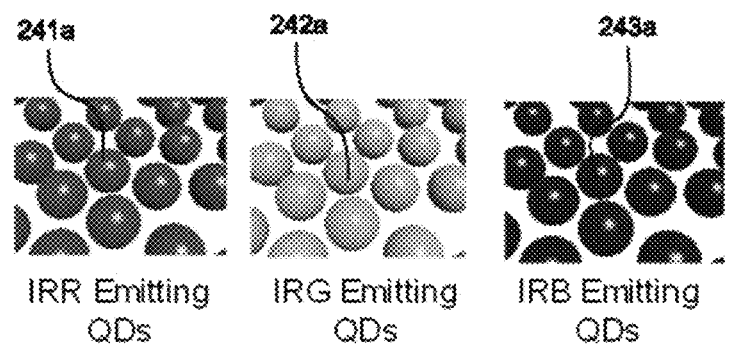
FIG. 8 is a schematic sectional view illustrating an invisible display device according to another embodiment of the present disclosure and a schematic view illustrating an infrared light Quantum dot.

FIG. 7 and FIG. 8 is a schematic sectional view illustrating an invisible display device and a schematic view illustrating an infrared light Quantum dot according to another embodiment of the present disclosure, respectively.

As shown in FIG. 7, an invisible display device 200 according to the present disclosure may be realized by a light emitting structure. Such light emitting structure may include a substrate 210, a circuit pattern 220, an infrared light emitting unit 240 and an infrared light shielding unit 260. Furthermore, the invisible display device may further include the protection glass 270. Substantially, the above display device is almost the same as a light emitting display device for displaying the visible-light information, but there is a difference therebetween.

The substrate 210 is formed in an approximately flat plate-shape and may be formed of any one selected from glass, plastic and equivalent thereof. However, the present disclosure is not limited thereto.

The circuit pattern 220 is formed on an upper face of the substrate 210. A wiring constituting the circuit pattern 220 is formed of cooper or aluminum, a semiconductor device constituting the circuit pattern may be a conventional thin film transistor. However, the present disclosure is not limited thereto.

The infrared light emitting unit 240 may be formed on the circuit pattern 220 and emits the infrared light in the predetermined wavelength range in response to the current applied thereto.

In particular, the infrared light emitting unit 240 may include a first infrared light emitting region 241 realizing the first infrared sub-pixel 71, a second infrared light emitting region 242 realizing the second infrared sub-pixel 72 and/or a third infrared light emitting region 243 realizing the third infrared sub-pixel 73. In other words, when the current is applied to the first, second and third infrared light emitting regions 241, 242 and 243, the above infrared light emitting regions emit the first, second and third infrared lights in the first, second and third wavelength ranges, respectively.

The infrared light shielding member 260 is located above the circuit pattern 220 (the wiring and/or the semiconductor device, etc.) formed at an outside, which is not overlapped with the first, second and third infrared light emitting regions 241, 242 and 243 in the vertical direction, to allow the infrared light in the unnecessary wavelength range not to be discharged through the invisible display device 200. The infrared light shielding member 260 may be formed on an upper face of the circuit pattern 220, or on a lower face or an upper face of the protection glass 270. In addition, if the infrared light shielding member 260 is formed on the upper face of the circuit pattern 220, the infrared light shielding member may be formed by stacking a metallic infrared light absorbing thin layer and an electrical insulating thin layer formed of ceramic material. Furthermore, if the infrared light shielding member 260 is formed on the lower face or the upper face of the protection glass 270, the infrared light shielding member may be formed as the metallic infrared light absorbing thin layer.

Meanwhile, the protection glass 270 may be further placed on upper faces of the first, second and third infrared light emitting regions 241, 242 and 243 to protect these regions.

Due to the above structure, in the invisible display device 200 including the light emitting structure according to the present disclosure, when the current is applied to the first infrared light emitting region 241, the first infrared light in the first wavelength range is emitted, when the current is applied to the second infrared light emitting region 242, the second infrared light in the second wavelength range is emitted, and when the current is applied to the third infrared light emitting region 243, the third infrared light in the third wavelength range is emitted so that the invisible display device displays the multi-colored or full color infrared light information. Furthermore, the light emitting structure can change the color of the infrared light information realized in monochrome over the time.

Meanwhile, as shown in FIG. 8, the first, second and third infrared light emitting regions 241, 242 and 243 may be formed as first, second and third infrared light Quantum dots

241a, 242a and 243a, respectively. A dimension, shape and chemical composition of the infrared light Quantum dot are controlled to allow a band gap to exceed the visible light region so that the infrared light Quantum dot can emit the infrared light in various wavelength ranges. Such infrared light Quantum dot has the advantage that the desired wavelength range and width are easily controlled. In addition, when the first, second and third infrared light Quantum dots 241a, 242a and 243a are mixed with each other, the infrared light Quantum dot 244 emitting the infrared light in the wavelength range including the first, second and third wavelength ranges. Such infrared light Quantum dot 244 may be employed as the material for the infrared light backlight 150 as described above. Furthermore, the infrared light Quantum dot 244 may also be employed as the material for the infrared light backlight 150 emitting the infrared light in the wavelength range including the first, second and third infrared light wavelength ranges.

Figure 9:
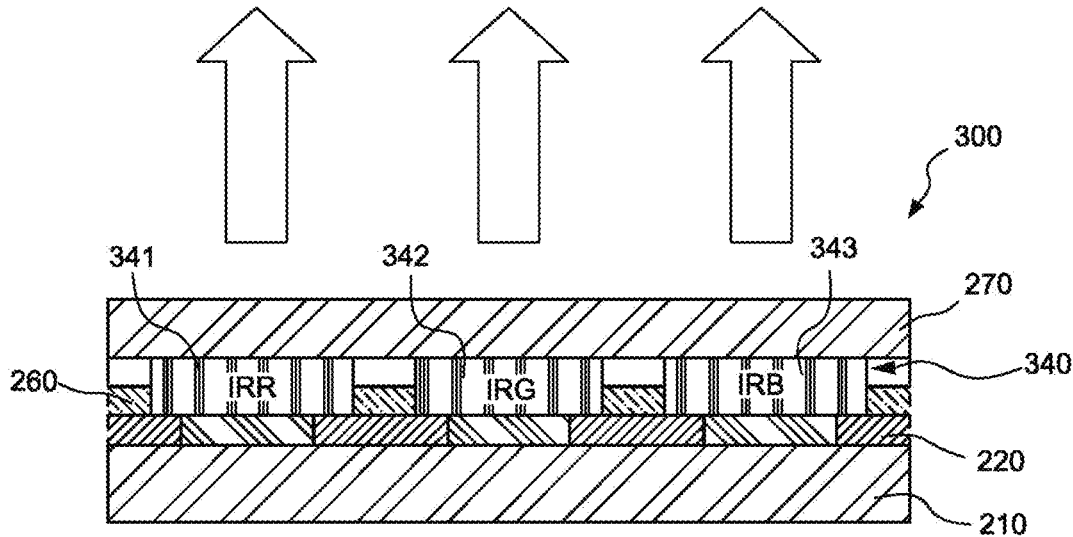
FIG. 9 and FIG. 10 is a schematic sectional view illustrating an invisible display device according to yet another embodiment of the present disclosure and a schematic plane view illustrating an infrared light resistor.
Figure 10:
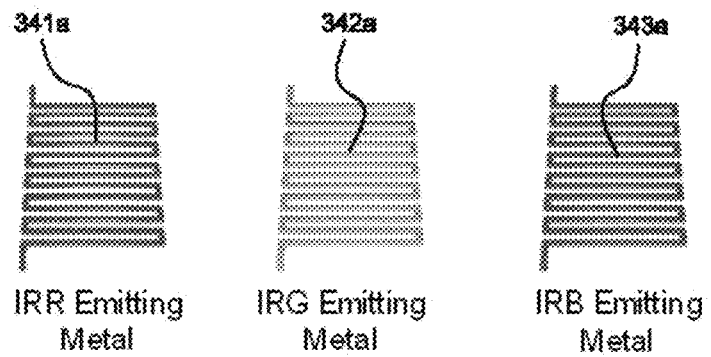

FIG. 9 and FIG. 10 are a schematic sectional view illustrating an invisible display device and a schematic plane view illustrating an infrared light resistor according to yet another embodiment of the present disclosure, respectively.

As shown in FIG. 9, an invisible display device 300 according to the present disclosure may be realized by a light emitting structure. Such light emitting structure includes the substrate 210, the circuit pattern 220, an infrared light emitting unit 340 and the infrared light shielding unit 260, and the above structure is similar to the invisible display device 200 described using FIG. 7.

However, as shown in FIG. 10, first, second and third infrared light emitting regions 341, 342 and 343 constituting the infrared light emitting unit 340 may be first, second and third infrared light resistors 341a, 342a and 343a, respectively, Such resistor may be a patterned graphene or a metal thin layer emitting the infrared light through the thermal emission caused by an electrical resistance. Therefore, electrical resistance values of the first, second and third infrared light resistors 341a, 342a and 343a may differ from each other. As one example, the resistance value of the first infrared light resistor 341a may be greater than that of the second infrared light resistor 341b and the resistance value of the second infrared light resistor 341b may be greater than that of the third infrared light resistor 341c. To this end, in the present disclosure, a length, width and/or thickness of each of the first, second and third infrared light resistors 341a, 342a and 343a may be variously changed. In the present disclosure, however, the order of the resistance values is not limited, and the resistance values of the resistors may be varied according to the materials employed for forming the invisible display device.

In addition, the first, second and third infrared light resistors 341a, 342a and 343a have the same electrical resistance value and may be formed to apply different currents. In the case where the currents whose values differ from each other are applied to the first, second and third infrared light resistors 341a, 342a and 343a, respectively, when the vision equipment such as the thermo-graphic camera is employed, the infrared lights emitted from the above resistors can be classified and observed as the different colors. Therefore, by differentiating the values of the currents applied to the first, second and third infrared light resistors 341a, 342a and 343a, the required infrared information can be realized.

Such first, second and third infrared light resistors 341a, 342a and 343a may be formed of various resistors. For example, the resistor is formed of an organic conductive material, an inorganic conductive material respectively. The resistor is formed of material such as an indium tin oxide (ITO), an indium zinc oxide (IZO), a zinc oxide, a flourine doped tin oxide (FTO) or a grapheme. The resistor is formed of material such as copper, nickel, aluminum, silver, gold, chromium or alloy metal of them. In the present disclosure, however, the material of the resistor is not limited.

If the first, second and third infrared light emitting regions 341, 342 and 343 are formed of the first, second and third infrared light resistors 341a, 342a and 343a, there are advantages that the process for manufacturing the invisible display device 300 is easily performed, the production yield-rate is increased, the service life of the device is lengthened, a driving operation is stable and a manufacturing cost is lowered.

Figure 11:
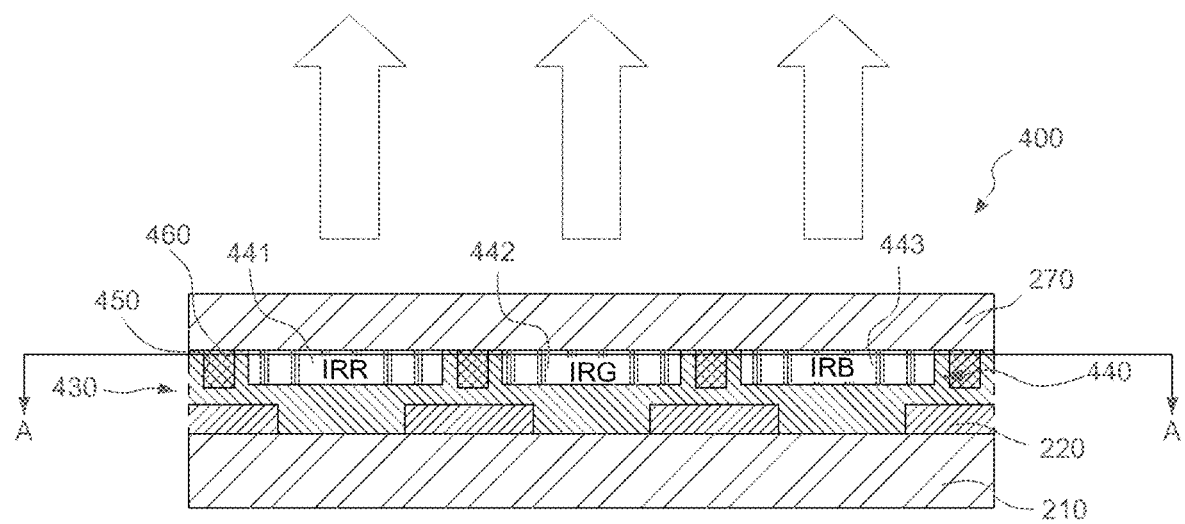
FIG. 11 is a schematic sectional view illustrating an invisible display device according to another embodiment of the present disclosure and, and FIG. 12 is a cross-sectional view taken along the line A-A in FIG. 11.
Figure 12:
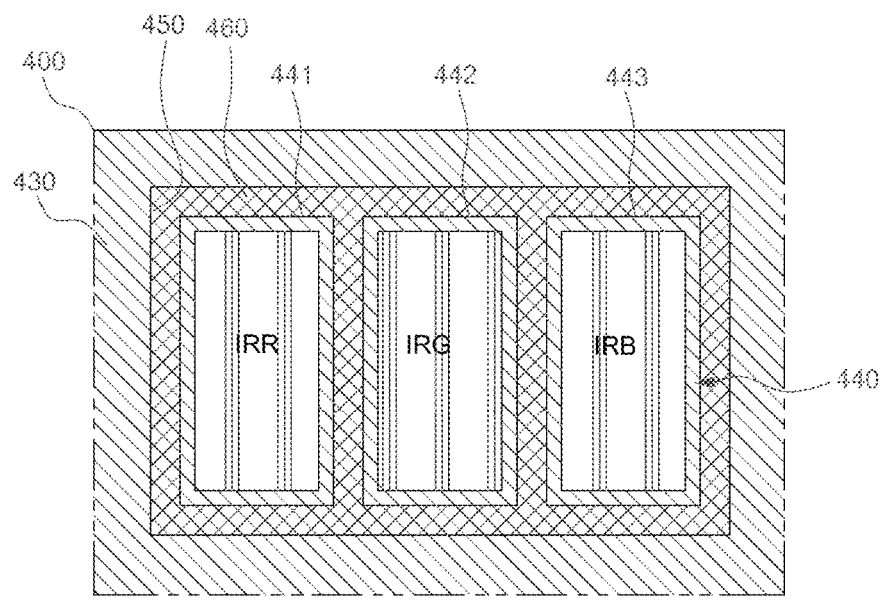

FIG. 11 is a schematic sectional view illustrating an invisible display device according to another embodiment of the present disclosure, and FIG. 12 is a cross-sectional view taken along the line A-A in FIG. 11.

As shown in FIG. 11, an invisible display device 400 according to the present disclosure may be realized a light emitting structure. Such light emitting structure includes the substrate 210, the circuit pattern 220, an insulating layer 430, an infrared light emitting unit 440 and a thermal insulating trench 450. In addition, the light emitting structure may further include a thermal insulating bar 460. The invisible display device 400 including the light emitting structure is partially similar to the invisible display device 200 described with reference to FIG. 7 or the invisible display device 300 described with reference to FIG. 9. Also, since the insulating layer 430 shields the infrared light generated from the circuit pattern 220, there is no need to form separate infrared light shielding layer in the invisible display device 400.

The insulating layer 430 having a predetermined thickness is formed on an upper face of the substrate 210 and an upper face of the circuit pattern 220. This insulating layer 430 covers the entire upper faces of the substrate 210 and the circuit pattern 220 to electrically insulate the circuit pattern 220.

The infrared light emitting unit 440 is formed on the insulating layer 430 and includes first, second and third infrared light emitting regions 441, 442 and 443. This infrared light emitting unit 440 may be formed in first, second and third light emitting grooves 441a, 442a and 443a formed in the insulating layer 430 and may be extended from an upper face to a lower face of the insulating layer. In addition, this infrared light emitting unit 440 may be formed on the upper face of the insulating layer 430. In addition, such infrared light emitting unit 440 may be directly formed on a region of the upper face of the substrate 210, on which the circuit pattern 220 is not formed. In this instance, the substrate 210 is formed integrally with the insulating layer 430.

The first, second and third infrared light emitting regions 441, 442 and 443 constituting the infrared light emitting unit 440 may be the first, second and third infrared light resistors 341a, 342a and 343a as shown in FIG. 10. Since the first, second and third infrared light resistors 341a, 342a and 343a are already described above, the detail description thereon is omitted. The first, second and third infrared light resistors 341a, 342a and 343a are electrically connected to the circuit pattern via connecting wiring or via holes formed on the insulating layer. These first, second and third infrared light resistors 341a, 342a and 343a emit the infrared light as well as heat when the voltage is applied from the circuit pattern 220 thereto.

The thermal insulating trench 450 has predetermined depth and width, and is formed along boundaries of the first, second and third infrared light emitting regions 441, 442 and 443. That is, as shown in FIG. 11, the thermal insulating trench 450 may have a rectangular shape which is a cross-sectional shape perpendicular to the extending direction. Meanwhile. The thermal insulating trench 450 may be formed to have a shape such as a curved shape, a semicircular shape, or a triangular shape at the bottom corner in the rectangular shape. Also, the thermal insulating trench 450 may be formed to have a plane shape such as in a rectangular shape having, a square shape having curved edges, or an elliptical shape.

This thermal insulating trench 450 spatially separates the first, second and third infrared light emitting regions 441, 442 and 443 from each other to reduce a heat diffusion from at least one of the infrared light resistors 341*a*, 342*a* and 343*a* of the infrared light emitting regions 441, 442 and 443 adjacent to each other, to the neighboring infrared light emitting region(s). Therefore, the thermal insulating trench 450 reduces the unwanted infrared rays emitted by the heat that is generated in one of the infrared light emitting regions 441, 442 and 443 and is conducted to the adjacent infrared light emitting regions 441, 442 and 443.

The thermal insulating trench 450 has the depth and width (or height) of 0.1 to 500 μm, preferably, of 1 to 200 μm. The appropriate width of the thermal insulating trench 450 may be determined depending on a gap between the adjacent infrared light emitting regions.

The thermal insulating trench 450 is filled with the thermal insulating bar 460. This thermal insulating bar 460 may be formed of ceramic material having thermal insulating characteristic. For example, the thermal insulating bar may be formed of material such as zirconia or silicon dioxide. Such thermal insulating bar further reduces a heat conduction from at least one of the infrared light resistors 341*a*, 342*a* and 343*a* of the infrared light emitting regions 441, 442 and 443 adjacent to each other to the neighboring infrared light emitting region(s).

Therefore, the invisible display device 400 according to this embodiment of the present disclosure blocks of heat generated from any one of the infrared light resistors 341*a*, 342*a* and 343*a* of the infrared light emitting regions 441, 442 and 443 from being conducted to the neighboring infrared light emitting region(s) and emits the infrared light from only at least one light emitting region 441, 442 and/or 443 required to emit the infrared light so that the infrared light information can be more clearly represented.

Figure 13:
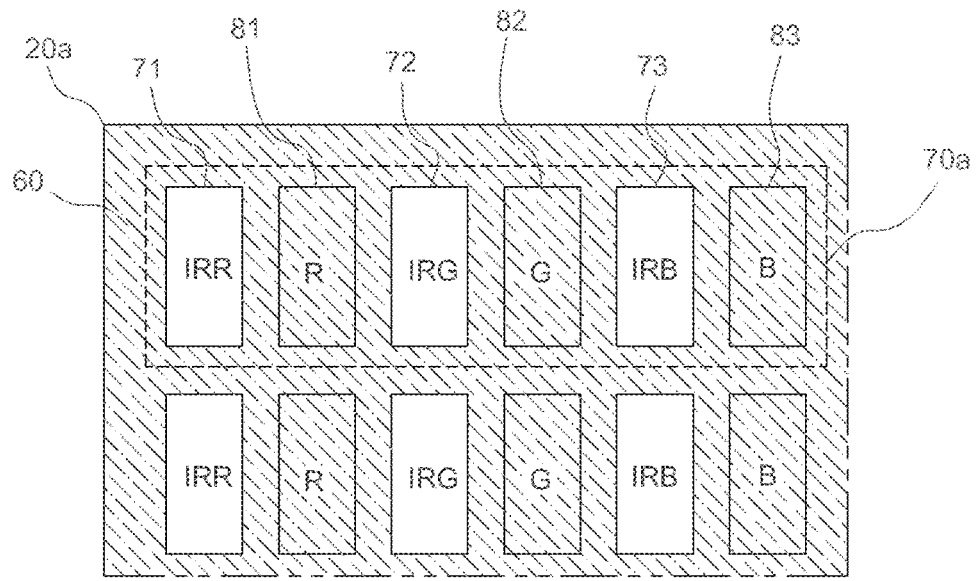
FIG. 13 is a schematic plane view illustrating a pixel structure of an invisible display device according to another embodiment of the present disclosure.

FIG. 13 is a schematic plane view illustrating a pixel structure of an invisible display device according to yet another embodiment of the present disclosure.

As shown in FIG. 13, each of a plurality of pixels 70*a* may be in a form obtained by mixing the infrared sub-pixels 71, 72 and 73 and the visible light sub-pixels 81, 82 and 83. In other words, each of a plurality of pixels 70*a* may include the first visible light sub-pixel 81 formed at one side of the first infrared sub-pixel 71 to emit the first visible light. In addition, each of a plurality of pixels 70*a* may include the second visible light sub-pixel 82 formed at one side of the second infrared sub-pixel 72 to emit the second visible light which differs from the first visible light. Furthermore, each of a plurality of pixels 70*a* may include the third visible light sub-pixel 83 formed at one side of the third infrared sub-pixel 73 to emit the third visible light which differs from the first and second visible lights.

In addition to the above, the infrared light shielding member 60 is formed at an outside of the first, second and third infrared sub-pixels 71, 72 and 73 and on the first, second and third visible light sub-pixels 81, 82 and 83 not to allow the unnecessary infrared light from the driving circuit of the infrared sub-pixels 71, 72 and 73, the embedded/external circuit placed at an outside and the visible light sub-pixels 81, 82 and 83 to be emitted.

Meanwhile, this invisible information display panel or device 20*a* may be operated in various modes. For example, only the first, second and third infrared sub-pixels 71, 72 and 73 may be operated, the first, second and third infrared sub-pixels 71, 72 and 73 may be operated together with the first, second and third visible light sub-pixels 81, 82 and 83 or only the first, second and third visible light sub-pixels 81, 82 and 83 may be operated.

Therefore, the invisible information display panel or device 20*a* according to the embodiment of the present disclosure may output the information which is recognized by only the night vision or the wavelength converter, output the above invisible information together with the visible light information which can be observed with the naked eye or output only the visible light information, if necessary.

The invisible display device according to the present disclosure may be applied for various fields.

For example, the invisible display device according to the present disclosure may display a bar code or a QR code, etc. which is not observed with the naked eye, but is recognized by a machine. Therefore, in the state in which the bar code or the QR code, etc. which is not observed with the naked eye is displayed, the visible light information which is observed with the naked eye may be displayed.

In addition, the invisible display device according to the present disclosure displays various hidden code which requires the information security, and this information is recognized by the machine so that it is possible to maintain the confidential matters which are not observed with the naked eye.

Furthermore, the invisible display device according to the present disclosure displays the information such as a map or a command in a dark night combat situation to allow the solider to recognize the information using the machine. In particular, the invisible display device according to the present disclosure may be attached to a soldier's body or a weapon of our troop to allow the soldier wearing a glass for infrared optics to identify our troop.

Figure 14:
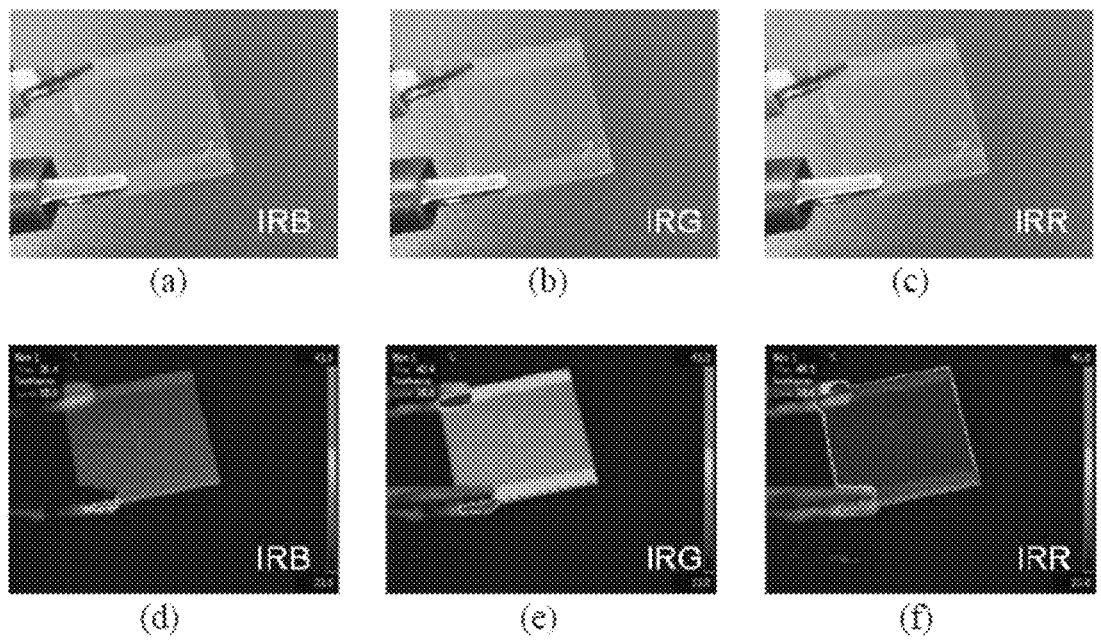
FIG. 14 is an image illustrating a color implementation of a subpixel constituting an invisible display device according to the present invention.

FIG. 14 is a photograph showing a color implementation in a unit cell corresponding to a sub-pixel constituting an invisible display device according to the present invention.

In the unit cell of FIG. 14, a pattern is formed on the transparent substrate as a whole by the infrared ray resistor of graphene. The unit cell emits infrared rays of different wavelengths when the magnitude of the applied current is different.

(a), (b) and (c) in FIG. 14 are photographs in which IRB, IRG and IRR subpixels are implemented by current applied differently to the unit cells. As shown, the unit cells are in a transparent state.

(d), (e) and (f) in FIG. 14 are photographs taken with an infrared camera by implementing the unit cell in a state corresponding to (a), (b) and (c). As shown, (d), (e), and (f) show blue, green, and red, respectively.

Figure 15:
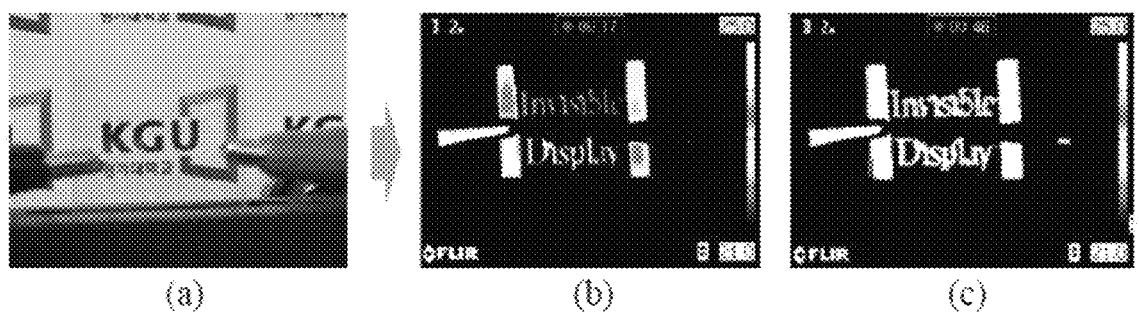
FIG. 15 illustrates text images displayed on an invisible display device according to the present disclosure.

FIG. 15 illustrates a text image displayed on the invisible display device according to the present invention.

The invisible display device shown in FIG. 15 is a device formed to express text by using graphene as an infrared resistor on a transparent substrate. As shown in (a) of FIG. 15, When observed with the naked eye, it seems that the invisible display device displays no information. However, as shown in (b) of FIG. 15, it is possible to verify that invisible display device displays a text image with a color when observed by an infrared camera. As shown in (c) of FIG. 15, it is possible to verify that the invisible display device is expressed to have different colors when the applied current is different.

Figure 16:
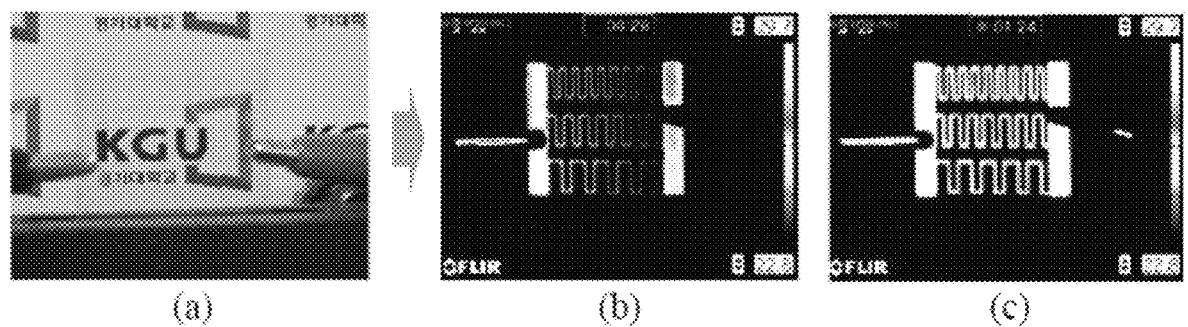
FIG. 16 illustrates figure images displayed on an invisible display device according to the present disclosure.

FIG. 16 illustrates figure images displayed on an invisible display device according to another embodiment of the present disclosure.

The invisible display device shown in FIG. 16 is the device in which the graphene employed as the infrared light resistor is mounted to the transparent substrate to represent the texts. As shown in (a) of FIG. 16, when observed with the naked eye, it seems that the invisible display device displays no information. However, as shown in (b) of FIG. 16. it is possible to verify that when observed by the infrared camera, the figure images are displayed on the invisible display device. As shown in (b) of FIG. 16, it is possible to verify that the invisible display device is expressed to have different colors when the applied current is different.

The device described above is only one embodiment for carrying out the invisible display device according to the present disclosure display, the present disclosure is not limited to the above device, and it will be appreciated that those skilled in the art can make any variation and modification without departing from the scope of the disclosure and any simple modification, variation and change based on the embodiments described herein is within the scope of the present disclosure.

INDUSTRIAL APPLICABILITY

The invisible display device of the present disclosure realizes the invisible information by using the wavelength in the ranges which cannot be observed with the naked eye to display the information which is unnecessary for a human to view, but is required for special purposes including socio-economic activities or the security information which is not allowed to be observed by the public, in multi-colors so that it is possible to increase the recognition rate of the information.

In addition, the invisible display device of the present disclosure effectively blocks the infrared light caused by heat which is unnecessarily generated in the circuit pattern and/or the visible light sub-pixel when the invisible information is displayed, thereby enabling the information to be accurately transmitted by the invisible information.

The invention claimed is:

1. An invisible display device having a plurality of pixels arranged therein for emitting infrared light, wherein each of the pixels comprises;
   a first infrared sub-pixel emitting first infrared light in a first wavelength range;
   a second infrared sub-pixel emitting second infrared light in a second wavelength range; and
   a third infrared sub-pixel emitting third infrared light in a third wavelength range.

2. The invisible display device of claim 1, wherein the first wavelength range, the second wavelength range and the third wavelength range differ from each other, the first wavelength range is smaller than the second wavelength range, and the second wavelength range is smaller than the third wavelength range.

3. The invisible display device of claim 1, wherein the first wavelength range, the second wavelength range and the third wavelength range are identical with other, the first wavelength intensity is smaller than the second wavelength intensity, and the second wavelength intensity is smaller than the third wavelength intensity.

4. The invisible display device of claim 1, wherein a plurality of pixels are realized by comprising a light emitting structure.

5. The invisible display device of claim 4, wherein the light emitting structure comprises;
   a substrate;
   a circuit pattern formed on one face of the substrate; and
   an infrared light emitting part formed on the circuit pattern.

6. The invisible display device of claim 5, wherein the infrared light emitting part comprises a first infrared light emitting region realizing the first infrared sub-pixel, a second infrared light emitting region realizing the second infrared sub-pixel and a third infrared light emitting region realizing the third infrared sub-pixel.

7. The invisible display device of claim 6, wherein the first, second and third infrared light emitting regions are formed of any one material selected from the group consisting of an organic conductive material, an inorganic conductive material, an indium tin oxide (ITO), an indium zinc oxide (IZO), a zinc oxide, a flourine doped tin oxide (FTC)), a graphene, And a first, second, and third infrared ray resistors formed of nickel, aluminum, silver, gold, and chromium.

8. The invisible display device of claim 7, wherein the first, second and third infrared light resistors have different resistance values from each other.

9. The invisible display device of claim 8, wherein the resistance value of the first infrared light resistor is greater than that of the second first infrared light resistor and the resistance value of the second infrared light resistor is greater than that of the third first infrared light resistor.

10. The invisible display device of claim 7, wherein the first, second and third infrared light resistors have the same electrical resistance value and the currents applied to the first, second and third infrared light resistors, respectively, have the magnitudes which differ from each other.

11. The invisible display device of claim 6, wherein the first, second and third infrared light emitting regions are formed of first, second and third infrared light quantum dots, respectively.

12. The invisible display device of claim 6, wherein an infrared light shielding member is located above the circuit pattern formed at an outside, which is not overlapped with the first, second and third infrared light emitting regions in the vertical direction, and the infrared light shielding member is formed by stacking a metallic infrared light absorbing thin layer and an electrical insulating thin layer formed of ceramic material or formed of the metallic infrared light absorbing thin layer.

13. The invisible display device of claim 1, wherein the plurality of pixels are realized by comprising a liquid crystal structure.

14. The invisible display device of claim 13, wherein the liquid crystal structure comprises;
   a substrate;
   a circuit pattern formed on one face of the substrate;
   a liquid crystal layer formed on the circuit pattern;
   a selective infrared light-wavelength transmitting filter formed on the liquid crystal layer; and
   an infrared-light backlight provided on the other face of the substrate to emit the infrared lights in the first, second and third wavelength ranges.

15. The invisible display device of claim 14, wherein the selective infrared light-wavelength transmitting filter comprises;
- a first selective infrared light-wavelength transmitting filter region formed on the liquid crystal layer to realize the first sub-pixel;
- a second selective infrared light-wavelength transmitting filter region formed on the liquid crystal layer to realize the second sub-pixel; and
- a third selective infrared light-wavelength transmitting filter region formed on the liquid crystal layer to realize the third sub-pixel.

16. The invisible display device of claim 15, wherein the first, second and third selective infrared light-wavelength transmitting filter regions are formed of meta-materials for transmitting the infrared light or multi-insulator filter materials.

17. The invisible display device of claim 15, wherein an infrared light shielding member is located above the circuit pattern formed at an outside, which is not overlapped with the first, second and third selective infrared light-wavelength transmitting filter regions in the vertical direction, and the infrared light shielding member is formed by stacking a metallic infrared light absorbing thin layer and an electrical insulating thin layer formed of ceramic material or formed of the metallic infrared light absorbing thin layer.

18. The invisible display device of claim 1, wherein each of a plurality of pixels comprises;
- a first visible light sub-pixel formed at one side of the first infrared sub-pixel to emit first visible light;
- a second visible light sub-pixel formed at one side of the second infrared sub-pixel to emit second visible light; and
- a third visible light sub-pixel formed at one side of the third infrared sub-pixel to emit third visible light.

19. The invisible display device of claim 18, wherein only the first, second and third infrared sub-pixels are operated, the first, second and third infrared sub-pixels are operated together with the first, second and third visible light sub-pixels, or only the first, second and third visible light sub-pixels are operated.

20. The invisible display device of claim 4, wherein the light emitting structure comprises;
- a substrate;
- a circuit pattern formed on an upper face of the substrate;
- an insulating layer formed on the upper face of the substrate and an upper face of the circuit pattern;
- an infrared light emitting unit formed on the insulating layer and comprising a first infrared light emitting region realizing the first infrared sub-pixel, a second infrared light emitting region realizing the second infrared sub-pixel and a third infrared light emitting region realizing the third infrared sub-pixel; and
- a thermal insulating trench formed between the first infrared light emitting region and the second infrared light emitting region and between the second infrared light emitting region and the third infrared light emitting region.

* * * * *